(12) United States Patent
Yang et al.

(10) Patent No.: US 6,327,467 B1
(45) Date of Patent: Dec. 4, 2001

(54) METHOD FOR COMPUTING MAXIMUM TRAFFIC CAPACITANCE OF A BASE STATION USING A VIRTUAL CALL

(75) Inventors: Seung Bong Yang; Jae Hwan Choi; Jae Yong Jeong, all of Ichon-shi (KR)

(73) Assignee: Hyudai Electronics Industries Co., Ltd., Kyongki-do (KR)

( * ) Notice: Subject to any disclaimer, the term of this patent is extended or adjusted under 35 U.S.C. 154(b) by 0 days.

(21) Appl. No.: 09/310,558

(22) Filed: May 12, 1999

(51) Int. Cl.[7] ........................................................ H04Q 7/34
(52) U.S. Cl. .......................... 455/423; 455/67.1; 370/241
(58) Field of Search .................................. 455/423, 67.1, 455/67.3, 67.4, 67.7, 446; 370/233, 234, 252, 241, 242; 375/213

(56) References Cited

U.S. PATENT DOCUMENTS

| | | | |
|---|---|---|---|
| 5,095,500 | * | 3/1992 | Tayloe et al. ............................ 379/32 |
| 5,425,076 | * | 6/1995 | Knippelmier ........................ 455/67.1 |
| 5,481,588 | * | 1/1996 | Rickli et al. ......................... 435/67.1 |
| 5,583,792 | * | 12/1996 | Li et al. ................................. 364/514 |
| 6,052,584 | * | 4/2000 | Harvey et al. ....................... 455/423 |

* cited by examiner

Primary Examiner—Edward F. Urban
(74) Attorney, Agent, or Firm—Merchant & Gould P.C.

(57) ABSTRACT

A method for computing maximum traffic capacitance of a base station using a virtual call in the digital mobile communication system in such a way that an operator at operating terminal for Base Station Manager (BSM) inputs call-set-request instructions using the virtual call to maintain and repair the digital mobile communication system so that traffic state is set between mobile stations in the service area of test base station and a vocoder of a Base Station Controller (BSC) to compute maximum traffic capacitance of the test base station. An operator at operation terminal inputs call set information by operator instruction as much as mobile station numbers to be tested to compute maximum traffic capacitance of the base station. The BSM inputs a virtual call-set-request-instruction by means of a virtual call-set-start-flag. A virtual call-set-path is given among the vocoder of the BSC, the channel element, and the mobile station without going through Mobile Switching Center (MSC) that processes call setting and switching of a traffic path.

7 Claims, 3 Drawing Sheets

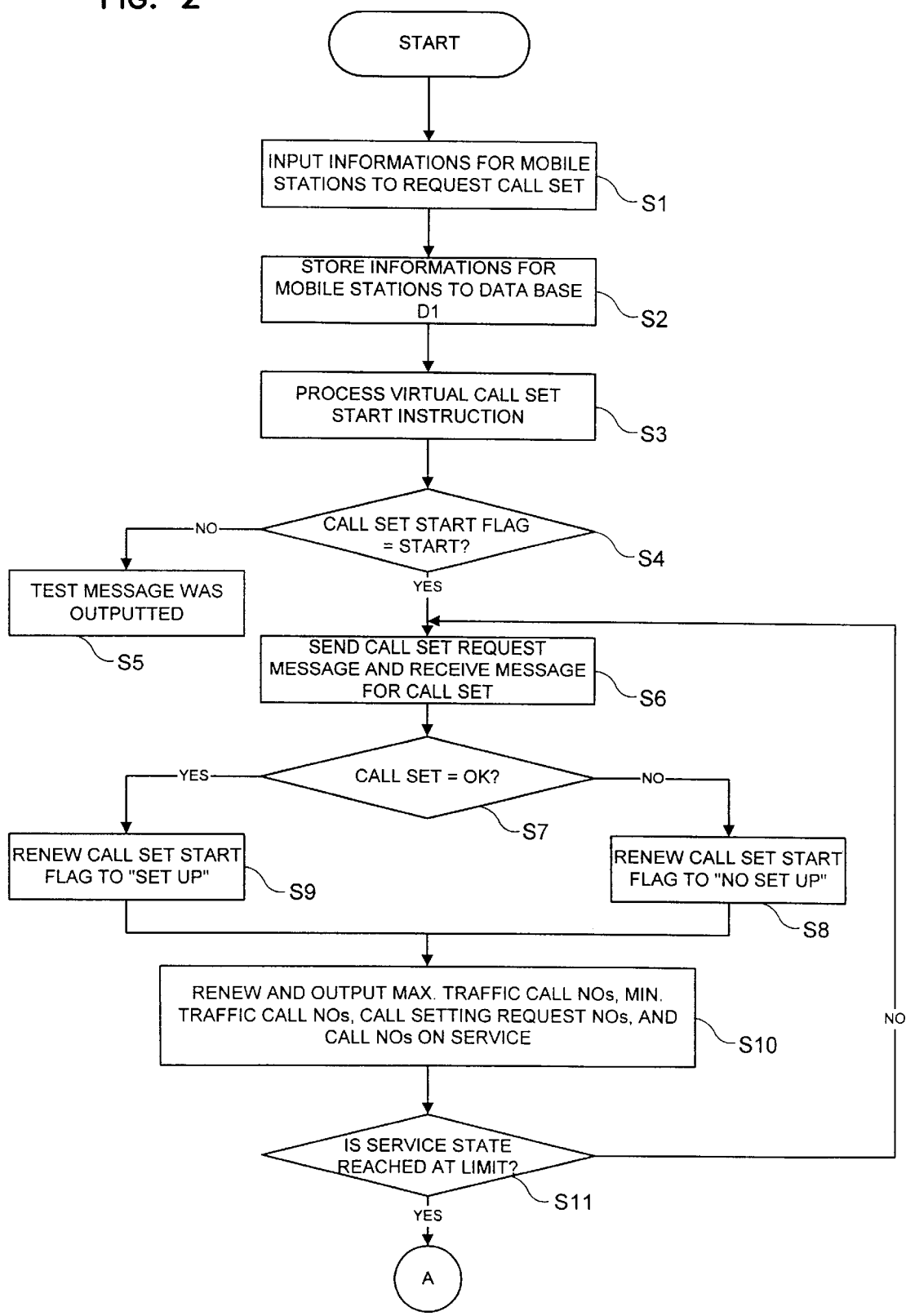

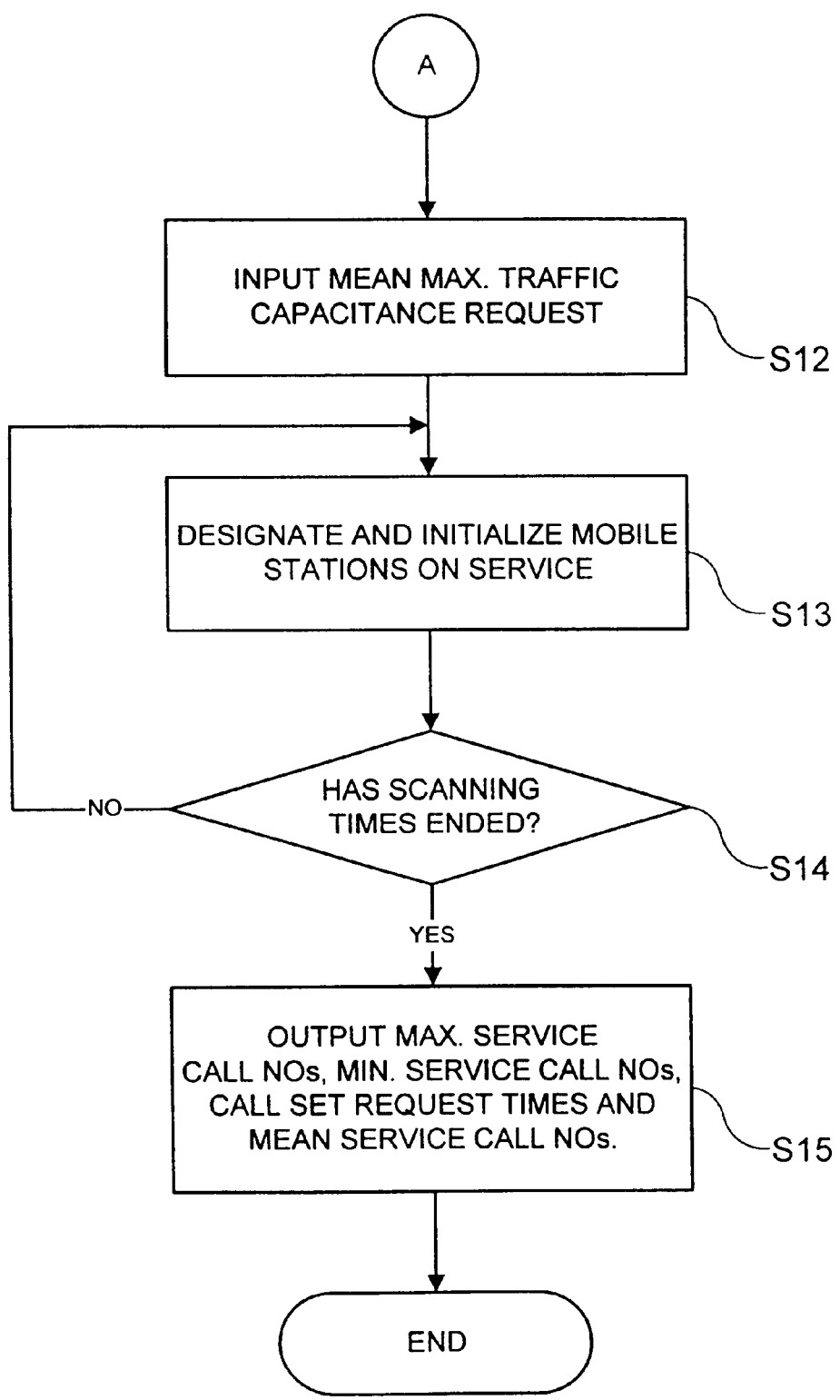

METHOD FOR COMPUTING MAXIMUM TRAFFIC CAPACITANCE OF A BASE STATION USING A VIRTUAL CALL

FIELD OF THE INVENTION

This invention relates to digital mobile communication system, more particularly to a method for computing maximum traffic capacitance of a base station using a virtual call in the digital mobile communication system in such a way that an operator at operating terminal for Base Station Manager (BSM) inputs call-set-request-instructions using the virtual call to maintain and repair the digital mobile communication system so that traffic state is set between mobile stations in the service area of a test base station and a vocoder of a Base Station Controller (BSC) to compute maximum traffic capacitance of the test base station.

BACKGROUND OF THE INVENTION

As a rule, maximum mobile station number being on service in a particular base station may be calculated manually through Mobile Switching Center (MSC) that processes call setting and switching of a traffic path, in the state of directly maintaining traffic either between test mobile stations or the test mobile stations and fixed subscribers in such a way that system operators set up the test mobile stations in the service area of the base station and provide communication service to general users to measure maximum traffic capacitance of the base station.

In the above case, however, a number of operators are needed to set the multiple mobile stations to a traffic state and it must be inevitably carried to monitor the existence of the mobile stations being abruptly cut from the traffic state and again make the cut mobile station to the traffic state. Therefore, many operators are needed to calculate maximum traffic capacitance of the base station, which results in difficulty in traffic calculation.

U.S. Pat. No. 5,583,792 shows network traffic analysis, which comprises the steps of receiving real traffic data, computing a steady state distribution function and power spectral function from the data, generating a stochastic model of a nonnegative rate random process using frequency domain techniques, inputting the nonnegative rate random process in a queue of the network node, performing queuing analysis on the queue and constructing the network node using the design of the network node. This technique, however, causes traffic computation to be difficult and complex because of receiving real traffic data, providing a traffic model and analyzing the same by means of stochastic access.

SUMMARY OF THE INVENTION

Therefore, the present invention has been made in view of the above mentioned problems, and an object of the invention is to provide a method for computing maximum traffic capacitance of a base station using a virtual call in a digital mobile communication system, which outputs the mobile station numbers on service to an operator whenever the mobile station numbers are changed on whether a call set has completed or not based on the virtual call and sends a call-set-request until the operator issues call-set-stop-instruction or the call set has completed as to the mobile stations being failed in call setting, so that the maximum traffic capacitance can be computed with ease for the operator to recognize present maximum traffic numbers on service and thereby to reduce the number of operators to participate in a test.

In accordance with one aspect of the invention, there is provided a method for computing maximum traffic capacitance of a base station using a virtual call in a digital mobile communication system comprising the steps of: (1) inputting and storing information for test mobile stations to a call set managing data base of Base Station Manager (BSM) to compute maximum traffic capacitance of the base station; (2) setting virtual calls to the mobile stations using instructions according to call type to set; (3) renewing the data base for the test mobile stations and outputting mobile station numbers on service; and (4) outputting statistics for mean maximum traffic capacitance of the test mobile stations.

In the one aspect, the step (2) further comprises the steps of: (1) initializing the call set managing data base and a maximum traffic capacitance computing data base for each mobile station upon request for a virtual call-set-start-instruction from an operator; (2) identifying whether a call-set-start-flag is set as start; and (3) when the call-set-flag was set as start, sending by the BSM a packet having the call-set-information for the test mobile stations in the call set managing data base of the BSM and virtual call type information to request call set to Call Control Processor (CCP), sending by the CCP a call-set-request-message to Base Transceiver Station Control Processor (BCP), and sending by the BCP information on whether the call set has completed to the CCP after performing action for setting call.

BRIEF DESCRIPTION OF THE DRAWINGS

The invention disclosed herein will be understood better with reference to the following drawing of which:

FIG. 2 are 2A and flowcharts showing the process for computing maximum traffic capacitance of a base station using the virtual call according to the present invention.

DETAILED DESCRIPTION OF THE PREFERRED EMBODIMENTS

Figure 1:
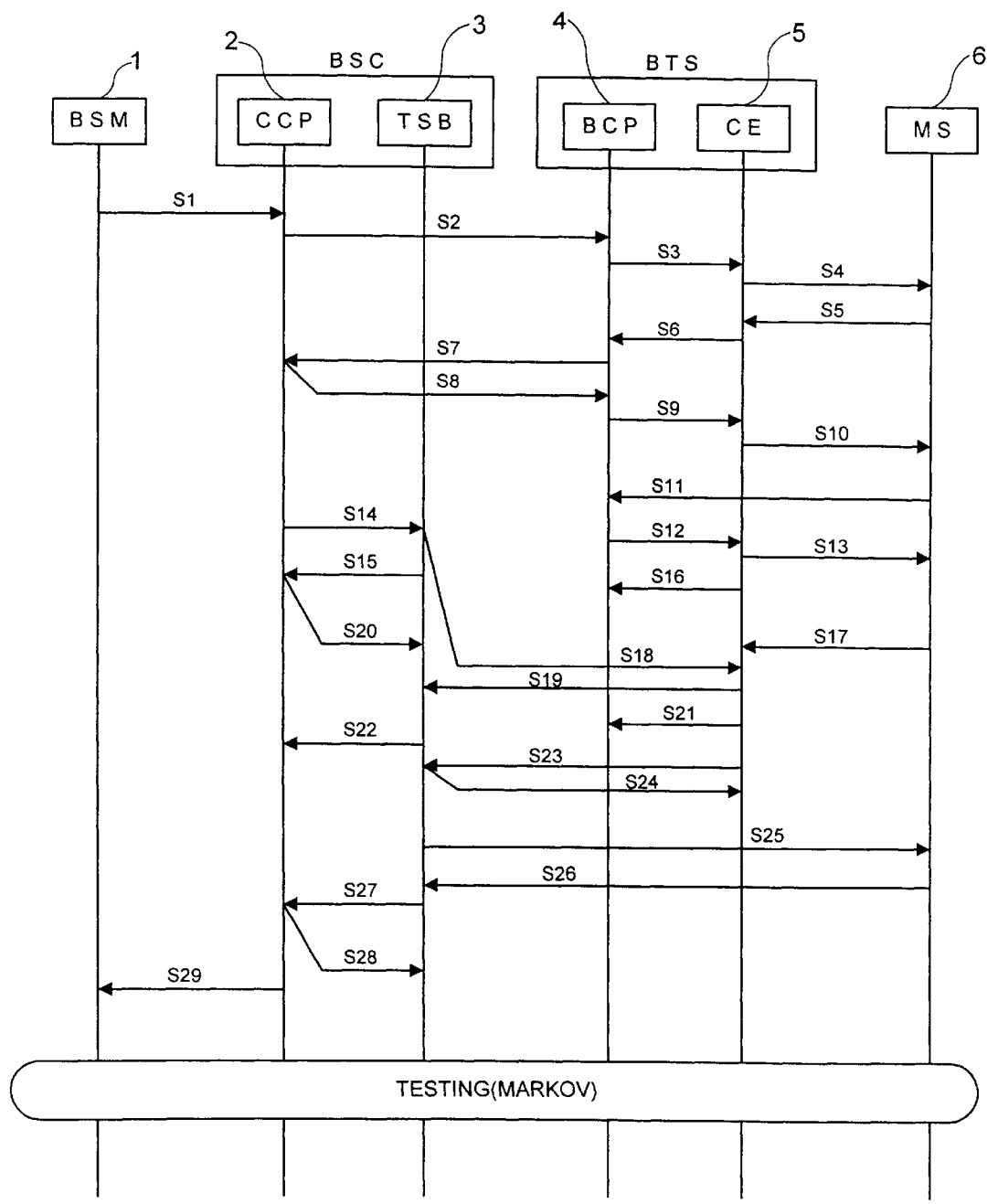
FIG. 1 is a flowchart for call-set-path-signals that a traffic is set using a virtual call of the present invention.

Now, preferred embodiments of the present invention will be described in conjunction with attached drawings.

Referring to FIG. 1, there is shown a flowchart for call-set-path-signals that a traffic is set using a virtual call of the present invention.

First of all, the BSM 1 requests a virtual call from the CCP 2, the CCP 2 receives the request (S1) and requests the BCP 4 of associated BTS (S2) to call Mobile Station (MS) 6. The BCP 4 receives the request and requests Cannel Element (CE) 5 to call the MS 6 through a paging channel, and the CE 5 calls the MS 6 through the paging channel (S4). Then the MS 6 that is watching the call senses and responds to the call for itself (S5), the CE 5 reports to the BCP 4 that the MS 6 responded to the request for the virtual call (S6), the BCP 4 requests the CCP 2 to set the virtual call (S7), the CCP 2 acknowledges setting of the virtual call to the BCP 4 (S8), the BCP 4 transfers information for initializing and reconstructing of a traffic channel to the CE 5 and activates the traffic channel (S9), and the CE 5 sends forward null traffic data to the MS 6 to maintain connection with the MS 6 (S10).

The MS 6 receives the traffic data and acknowledges activation of the traffic channel to the BCP 4 (S11), the BCP informs the CE 5 of the allocation results of the traffic channel (S12), the CE 5 informs the MS 6 of the allocation results through the paging channel (S13), the CCP 2 sends information required to set a vocoder to the Transceiver Selector Bank (TSB) 3 (S14), and the TSB 3 requires arranging information with regard to the call set from the CCP 2(S15).

Further the CE 5 acknowledges to the BCP 4 as to informing of the allocation results of the traffic channel (S16), the MS 6 sends reverse null traffic data to the CE 5 to maintain connection with the BTS (S17), time synchronization is matched between the TSB 3 and the CE 5 (S18,19), and the CCP 2 provides to the TSB 3 Program Load Data(PLD) required to set the call such as in-traffic system parameter, time sync control parameter, reverse power control parameter, forward power control parameter etc. (S20).

The CE 5 informs the BCP 4 that the traffic channel and the vocoder have been linked (S21), the TSB 3 informs the CCP 2 that the traffic channel and the vocoder have been linked (S22), the CE 5 informs the TSB 3 that the reverse traffic channel has acquired, and the TSB 3 acknowledges to the informing (S24) and informs the MS 6 that the traffic channel is available (S25).

Then the MS 6 acknowledges the informing in S 25 (S26), the TSB 3 reports to the CCP 2 that the virtual call with the MS 6 has set (S27), and the CCP 2 acknowledges the reporting in S27 (S28) and reports the set state of the virtual call to the BSM 1 (S29). By means of the above process, the virtual call to compute maximum traffic capacitance of the base station may be set.

In FIGS. 2 and 2A, a flowchart is illustrated showing the process for computing maximum traffic capacitance of the base station using the virtual call according to the present invention.

Referring to the drawing, the process comprises the steps of: a first process of inputting and storing information for test mobile stations to compute maximum traffic capacitance of the base station to a call set managing data base of the BSM; a second process of requesting call setting to the CCP 2 using instructions according to a call type (Markov Call or Service Option 2) to set; a third process of receiving information with regard to the call setting and call cutting from the CCP 2, renewing the data base for the test mobile stations and outputting mobile station numbers on service; and a fourth process of outputting statistics for mean maximum traffic capacitance of the test mobile stations during the time requesting maximum traffic capacitance computing for the test mobile stations.

At first, a description for the first process will be explained. An operator inputs and stores the information for the test mobile stations to the call set managing data base D1 (S1, S2). In general, the numerals of the test mobile stations may be in the range of 100 to 120.

The information comprises base station numbers, mobile station identification numbers, station mark class (characteristics having the mobile station) and traffic data rates, etc.

Then the second process will be explained. In the step 3, a virtual call-set-start-instruction using the virtual call is processed. That is, in the step 3, the BSM 1 initializes the call set managing data base D1 and a maximum traffic capacitance computing data base D2 for each mobile station upon request for the virtual call-set-start-instruction from an operator. Also the BSM 1 identifies whether a call-set-start-flag is set as start (S4). When the call-set-flag was set as start, the BSM 1 sends a packet having the call-set-information for the test mobile stations in the call set managing data base of the BSM and a virtual call type information to request call set to the CCP 2. Then the CCP 2 sends a call-set-request-message to the BCP 4 and the BCP 4 sends information on whether the call set has completed to the CCP after performing action for setting call (S6). In the step S4, when the call-set-flag was not set as start, it means that test message has already been outputted (S5).

In the present invention, types of the virtual call may be Markov call or Service option 2 as well known in the art. The Markov call provides pseudo random data to test the traffic channel between the mobile station, the channel of the BTS and the vocoder of the BSC. The test may be performed with a fixed data rate at one of 9600 bps, 4800 bps, 2400 bps and 1200 bps or a variable data rate. The mobile station and the vocoder of the BSC generate packet data for each traffic channel frame according to the rate to be desired by the operator. In case of the variable data rate, rate for each data may be selected by the pseudo random process being Qualcomm standard and the content of each packet also be processed by the pseudo random process. The vocoder of the BSC and Markov service option of the mobile station count numbers of transmission frame per each rate, and count type of received frame according to comparing results between information provided by a multiplex sublayer, received packet and a duplicate produced by itself then take statistics on frame error. Data transmission rate in testing by the variable data rate is determined by 4-state second order Markov chain (determined by transmission rate selected for 2 packets prior to present packet).

Referring to the Service option 2, the vocoder of the BTS produces and transmits primary traffic packet to the mobile station, which transmits the received packet to the vocoder after admitted delay. The vocoder can produce packet sizes of 171, 80, 40 16 and 0 bit(s). The Service option 2 allows normal message and second traffic and the mobile station transmits frame defining information with upper 2 bits on received packet to determine quality of the forward traffic channel.

Frame type of the traffic data is divided into forward traffic channel frames and reverse traffic channel frames such as a table 1 and a table 2 listed below.

TABLE 1

Forward Traffic Channel Frames

| Packet Type | Bits per Packet | Rate |
|---|---|---|
| Rate 1 | 171 | 9600 bps Traffic frame with 171 primary traffic bits |
| Rate 1/2 | 80 | 4800 bps Traffic or dim-and-burst Traffic with 80 primary bits |
| Rate 1/4 | 40 | 2400 bps Traffic or dim-and-burst Traffic with 40 primary bits |
| Rate 1/8 | 16 | 1200 bps Traffic or dim-and-burst Traffic with 16 primary bits |
| Blank | 0 | Blank-and-burst Traffic Channel frame |

TABLE 2

Reverse Traffic Channel Frames

| Packet Type | Bits per Packet |
|---|---|
| Rate 1 | 171 |
| Rate 1/2 | 80 |
| Rate 1/4 | 40 |
| Rate 1/8 | 16 |
| Blank | 0 |
| Rate 1 with Bit Errors | 171 |
| Insufficient Frame Quality (Erasure) | 0 |

The third process for renewing the data bases of the test mobile stations and outputting the numbers of the mobile stations on service will now be explained. The CCP 2 receives a message on whether the call setting has completed from the BCP 4 and checks on whether the call setting has completed in the step 7. When the call setting has completed, the CCP 2 sets the call-set-start-flag to "set up" in the data base D1 (S9). Also, when the call setting has not completed, the CCP 2 sets the call-set-start-flag to "no set up" in the data base D1 (S8). Then the BSM 1 renews maximum traffic call numbers, minimum traffic call numbers, call setting request numbers and call numbers on service in the data base D2 and outputs the associated information to the operator (S10).

In the step 7, a call setting path is as follows; the vocoder of the BSC⇌channel element⇌the mobile station.

In the step 11, the CCP 2 identifies that the call-set-start-flag was set to "set up" until service states of the test mobile stations have reached a predetermined limit value. If not reaching the limit value, flow returns to step 6. In detail, the BSM 1 searches the data base D1 every 20 seconds. That is the time to be taken until the call setting has completed at one time. When it occurs that there are the mobile stations that are in non-traffic states due to problems in system or radio circumstance, the flow returns to the step 6.

In other words, the step 11 is performed for identifying traffic states for each mobile station because it is impossible to measure maximum mean traffic capacitance through call setting with one time. For example, if call settings for only a predetermined number of the mobile stations out of 120 mobile stations have completed due to various circumstances, the BSM 1 searches the data base D1 every 20 seconds and sends again the call-set-request-message to the CCP 2. According to this, call setting process for traffic state will be started again to take call setting for a predetermined number of the mobile stations. The process as described above will be repeated until service states of the mobile stations, which were required to set call, have reached the limit value to compute the maximum traffic capacitance of the base station.

Finally, the fourth process for outputting statistics for the mean traffic capacitance will be described. In the step 11, if it is judged that the service state has reached the limit value, the operator inputs mean maximum traffic capacitance request using scanning times representing how often an operator is intended to take statistics through setting of the virtual call (S12). The scanning times also represent the times for calculating the mean maximum traffic capacitance in relation with the mobile stations on service. The BSM 1 designate the mobile stations on service to maximum traffic number, minimum traffic number or the whole number of the mobile stations on service during the time requested from the operator and starts initializing operation for computing traffic based on the designation (S13). After identifying that the scanning times have ended (S14), the BSM 1 outputs information for maximum service call numbers, minimum service call numbers, call-set-request times and mean service numbers. According to this process, the operator can recognize statistics for the mean maximum traffic capacitance (S15). In the step 14, when the scanning times have not ended, flow returns to step 13.

In case of receiving input in step 12, the BSM 1 initializes the data base D2 and renews next data base to compute mean maximum traffic capacitance inputted from the operator every 10 seconds. The mean maximum traffic capacitance is given as scanning times/sum of calls on service every 10 seconds.

According to the above description, the present invention has the effect of outputting the mobile station numbers on service to an operator whenever the mobile station numbers are changed on whether a call set has completed or not based on the virtual call and sends a call-set-request until the operator issues call-set-stop-instructions or call set has completed as to the mobile station being failed in call setting, so that the maximum traffic capacitance can be computed with ease for the operator to recognize present maximum traffic numbers on service and thereby to reduce the number of operators to participate in a test.

It is further understood by those skilled in the art that the foregoing description is a preferred embodiment of the disclosed method and that various changes and modifications may be made in the invention without departing from the spirit and scope thereof.

What is claimed is:

1. A method for computing maximum traffic capacitance of a base station using a virtual call in a digital mobile communication system comprising the steps of:

inputting and storing information for test mobile stations to a call set managing data base of a Base Station Manager (BSM) to compute maximum traffic capacitance of the base station;

requesting call set-up to a Call Control Processor (CCP) using instructions according to call type to set up virtual calls to the test mobile stations;

receiving information regarding the call setting and call cutting from the CCP, renewing the data base for the test mobile stations and outputting mobile station numbers on service; and outputting statistics for mean maximum traffic capacitance of the test mobile stations.

2. A method for computing maximum traffic capacitance of a base station using a virtual call as claimed in claim 1, in which the step of setting virtual calls further comprises the steps of:

initializing the call set managing data base and a maximum traffic capacitance computing data base for each mobile station upon request for a virtual call-set-start-instruction from an operator;

identifying whether a call-set-flag is set as start; and when the call-set-flag was set as start, sending, by the BSM, a packet having the call-set-information for the test mobile stations in the call set managing data base of the BSM and virtual call type information to request call set to Call Control Processor (CCP), sending, by the CCP, a call-set-request-message to Base Transceiver Station Control Processor (BCP), and sending, by the BCP, information on whether the call set has been completed to the CCP after performing action for setting call.

3. A method for computing maximum traffic capacitance of a base station using a virtual all as claimed in claim 1, in which setting of the virtual call comprises that when BSM requests the virtual call, BTS calls MS through a paging channel, the MS reports response for the virtual call to the BTS, the BTS sends forward null traffic data to the MS after activating of a traffic channel, the BTS informs the MS of allocation of the traffic channel, the MS sends reverse null traffic data to the BTS to maintain connection with the BTS, the BTS informs BSC of acquisition for the reverse null traffic data, the BTS informs the MS that the traffic channel is available, the MS acknowledges to the BSC for the informing of the BTS, and the BSC reports setting of the virtual call to the BSM.

4. A method for computing maximum traffic capacitance of a base station using a virtual call as claimed in claim 1, in which the step of renewing the data base comprises the steps of:

checking on whether the call setting has completed;

renewing, when the call setting has completed, a call-set-start-flag to "set up" in the call set managing data base;

renewing, when the call setting has not been completed, the call-set-start-flag to "no set up" in the call set managing data base;

renewing maximum traffic call numbers, minimum traffic call numbers, call setting request numbers and call numbers on service in the maximum traffic capacitance computing data base and outputting the associated information to the operator; and identifying that service states of the test mobile stations have reached a predetermined limit value.

5. A method for computing maximum traffic capacitance of a base station using a virtual call as claimed in claim 1, in which the step of outputting statistics comprises the steps of:

if it is judged that the service state has reached the limit value in the step of identifying that service states of the test mobile stations have reached a predetermined limit value, inputting mean maximum traffic capacitance request using scanning times representing that an operator is intended to take statistics through setting of the virtual call how often, the scanning times also representing the time for calculating mean maximum traffic capacitance in relation with the mobile stations on service;

designating the mobile stations on service to maximum traffic number, minimum traffic number or the whole number of the mobile stations on service during the time requested from the operator and starting initializing operation for computing traffic based on the designation;

identifying that the scanning times have ended; and when the scanning times have ended, outputting information for maximum service call numbers, minimum service call numbers, call-set-request times and mean service numbers.

6. A method for computing maximum traffic capacitance of a base station using a virtual call as clam 1, in which a virtual call is set among vocoder of Base Station Controller (BSC), channel element and the test mobile station.

7. A method for computing maximum traffic capacitance of a base station using a virtual as claimed in claim 1, in which the type of the virtual call is Markov call or Service option 2.

* * * * *